(12) United States Patent
Fujiwara et al.

(10) Patent No.: US 6,310,683 B1
(45) Date of Patent: Oct. 30, 2001

(54) APPARATUS FOR READING FINGERPRINT

(75) Inventors: Minoru Fujiwara, Tokyo; Makoto Sasaki, Hachioji; Hiromitsu Ishii, Hamura; Tetsuo Muto, Hachioji, all of (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/128,237

(22) Filed: Aug. 3, 1998

(30) Foreign Application Priority Data

Aug. 5, 1997 (JP) .................................................. 9-222018
Aug. 5, 1997 (JP) .................................................. 9-222019
Oct. 7, 1997 (JP) .................................................. 9-289251

(51) Int. Cl.$^7$ .............................. G06K 9/74; G06K 9/00; H01L 31/0232
(52) U.S. Cl. ............................ 356/71; 250/556; 382/124; 257/436
(58) Field of Search .............................. 356/71; 382/115, 382/116, 124; 257/432, 436; 250/556

(56) References Cited

U.S. PATENT DOCUMENTS

| 4,336,998 | * | 6/1982 | Ruell ........................................ 356/71 |
| 5,446,290 | | 8/1995 | Fujieda et al. . |
| 5,448,649 | | 9/1995 | Chen et al. . |
| 5,461,419 | | 10/1995 | Yamada . |
| 5,463,420 | | 10/1995 | Yamada . |
| 5,708,497 | | 1/1998 | Fujieda . |
| 6,150,665 | * | 11/2000 | Suga ........................................ 356/71 |

FOREIGN PATENT DOCUMENTS

| 0 609 812 A | 8/1994 | (EP) . |
| 6-325158 | 11/1994 | (JP) . |
| WO 97/14111 | 4/1997 | (WO) . |

OTHER PUBLICATIONS

Patent Abstracts of Japan, vol. 1997, No. 09, Sep. 30, 1997, Abstract of JP 09 116128 A, May 2, 1997.
Patent Abstracts of Japan, vol. 013, No. 460, Oct. 18, 1989, Abstract of JP 01 179937 A, Jul. 18, 1989.

* cited by examiner

Primary Examiner—F. L. Evans
Assistant Examiner—Zandra V. Smith
(74) Attorney, Agent, or Firm—Frishauf, Holtz, Goodman, Langer & Chick, P.C.

(57) ABSTRACT

A light beam emitted by a surface illuminant reaches the surface of a transparent base layer of a recess/projection detection optical element. A light beam emitted almost vertically is emitted to an air layer. A light beam incident on the transparent base layer at an angle larger than a total reflection angle returns to a two-dimensional photosensor at a portion contacting the air layer, but scatters in a transparent particle at a portion contacting the transparent particle. When a finger is brought into contact with a scattering reflection layer, the scattering reflection state does not change in an area corresponding to a valley of a fingertip. As indicated by an arrow, an amount of reflected light beam is large. In an area corresponding to a ridge of the fingertip, the light beam scattered by the transparent particle is absorbed. The amount of reflected light beam is small, as indicated by an arrow. An image having bright and dark portions optically emphasized in correspondence with the valley and ridge of the fingertip of the finger can be obtained.

30 Claims, 13 Drawing Sheets

APPARATUS FOR READING FINGERPRINT

BACKGROUND OF THE INVENTION

The present invention relates to a reading apparatus for reading the shape or position of a recess or projection of a target object having a fine recess or projection such as a valley or ridge of a fingertip.

A structure described in Jpn. Pat. Appln. KOKAI Publication No. 6-325158 is conventionally known as a reading apparatus for reading the shapes or positions of fine recesses or projections such as valleys or ridges of a fingertip. As shown in FIG. 16, this apparatus has a two-dimensional photosensor 2 disposed on a surface of a light source or an illuminant 1. An optical fiber bundle plate 3 having a bundle of a plurality of optical fibers 3a is formed on the two-dimensional photosensor 2. A light-reflecting plate 4 is disposed on the optical fiber bundle plate 3. The two-dimensional photosensor 2 has a light-shielding plate 2c having an openings 2b on a transparent substrate 2a. Sensor portions 2d are formed on the light-shielding plate 2c. The light-reflecting plate 4 is made of a transparent material sheet and has a plurality of V-grooves 4b on each of which a light-reflecting-layer 4a made of an aluminum or the like is deposited. A portion between the two adjacent V-grooves 4b is constituted by a projection 4d having a flat upper surface 4c and a substantially trapezoidal section.

Almost all the components of this reading apparatus are flat to obtain a low-profile structure. As indicated by arrows in FIG. 16, parallel light beams are emitted vertically from the upper surface of the surface illuminant 1 and transmitted to the upper surfaces 4c of the light-reflecting plate 4 through the openings 2b of the two-dimensional photosensor 2 and optical fibers 3a of the optical fiber bundle plate 3. The transmitted light beams are reflected by the light-reflecting layers 4a on the V-grooves 4b of the light-reflecting plate 4. These reflected light beams come into the adjacent optical fibers 3a other than the light-transmitting portion (optical fiber 3a) of the optical fiber bundle plate 3 and are incident on the sensor portions 2d of the two-dimensional photosensor 2. In this case, the beams are reflected by the upper surfaces 4c of the projections 4d of the light-reflecting plate 4 which correspond to the recesses (valleys) of the fingertip, and the beams are absorbed at the upper surfaces 4c which contact to the projections (ridges) of the fingertip. Therefore, an image having bright and dark portions optically emphasized in correspondence with the recesses and projections of the fingertip, thereby reading the fingerprint.

In the conventional reading apparatus of this type, the parallel beams are emitted vertically from the upper surface of the surface illuminant 1 and transmitted to the upper surface of the light-reflecting plate 4 through the openings 2b of the two-dimensional photosensor 2 and the optical fibers 3a of the optical fiber bundle plate 3. The light beams reflected by the upper surfaces 4c of the projections 4d of the light-reflecting plate 4 are reflected by the light-reflecting layer 4a of the V-grooves 4b of the light-reflecting plate 4 and come into the adjacent optical fibers 3a other than the optical fiber 3a having undergone transmission. The incident angle at the optical fiber 3a having a small light reception angle increases to result in a large loss. This makes it difficult to obtain a sufficiently high contrast. In addition, to make the light beams reflected by the upper surfaces 4c of the projections 4d of the light-reflecting plate 4 come into the optical fibers 3a of the optical fiber bundle plate 3 which are located at the predetermined positions and strike the sensor portions 2d of the two-dimensional photosensor 2 which are located at the predetermined positions in a prescribed manner, the projections 4d of the light-reflecting plate 4, the optical fibers 3a of the optical fiber bundle plate 3, and the sensor portions 2d of the two-dimensional photosensor 2 must be accurately positioned in a one-to-one correspondence, resulting in a low productivity and a high cost.

BRIEF SUMMARY OF THE INVENTION

It is an object of the present invention to provide an apparatus capable of reducing an optical loss in reading a fingerprint or the like, eliminating positioning among the respective components, and improving the productivity.

According to the present invention, there is provided a reading apparatus comprising:

a light source;

a photosensor having a transparent base layer formed on the light source, the photosensor having a plurality of photosensor portions formed on the base layer and a resin layer covering the photosensor portions; and a scattering reflection layer formed on the photosensor, wherein light emitted by the light source and scattered and reflected by the scattering reflection layer is incident on each photosensor portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

First Embodiment

Figure 1:
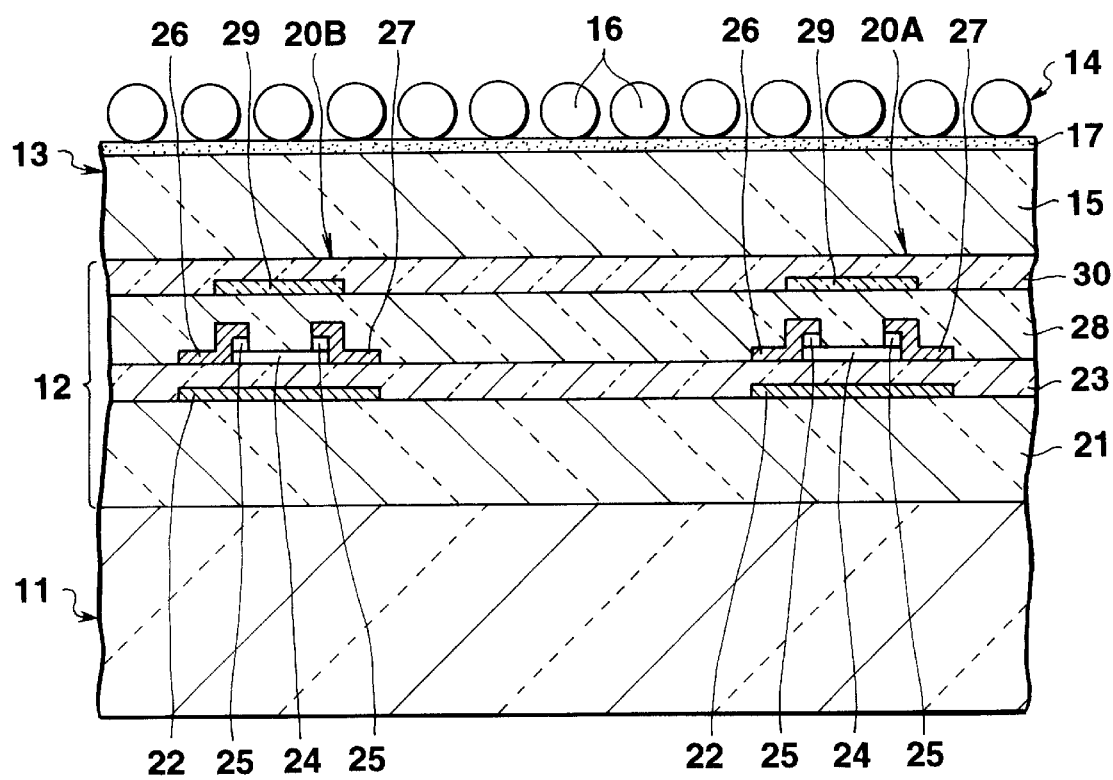
FIG. 1 is an enlarged sectional view showing part of a reading apparatus according to the first embodiment of the present invention.

FIG. 1 is an enlarged sectional view showing part of a reading apparatus according to the first embodiment of the present invention. This reading apparatus can read the shapes and/or positions of recesses or projections of a target object having fine recesses and/or projections. In the following embodiment, the reading apparatus will exemplify a fingerprint reading apparatus for reading a fingerprint. This fingerprint reading apparatus has a two-dimensional photosensor 12 on a light source or surface illuminant 11. A recess/projection detection optical element 13 is mounted on the two-dimensional photosensor 12. The surface illuminant 11 comprises an edge light type backlight used in an electroluminescence panel or a liquid crystal display device. Although not shown, the edge light type backlight typically has a light-reflecting plate on the bottom surface of a light guide plate, one point light source such as a light-emitting diode is disposed at a position adjacent to an edge of the light guide plate, and an opposite side to the light guide plate of the point light source is covered with a light-reflecting sheet.

The recess/projection detection optical element 13 has a scattering reflection layer 14. In the optical element 13, a large number of transparent spherical particles 16 made of a transparent resin (e.g., acrylic resin) or glass and located in tight contact with each other or spaced apart from each other at a small gap are adhered to the upper surface of a transparent base layer 15 made of a transparent resin (e.g., acrylic resin) or glass through a transparent adhesive layer 17.

The transparent spherical particles 16 adhered to the transparent base layer 15 constitute the scattering reflection layer 14. The function of the scattering reflection layer 14 will be described later. The adhesive layer 17 which fixes the transparent particles 16 may be an adhesive sheet or double-coated tape. An alternative adhesive layer may be a layer coated with a thermo-setting or ultraviolet-curable adhesive. When the latter adhesive layer is used, the adhesive layer 17 is hardened upon setting the thermo-setting adhesive or curing the ultraviolet-curable adhesive. Even if the transparent particles 16 are pressed by a finger, the adhesive layer 17 will not deform.

The recess/projection detection optical element 13 can be manufactured as follows. The adhesive layer 17 is formed on the upper surface of the transparent base layer 15 by printing, transfer, roll coating, or the like. The transparent particles 16 are sprinkled while the adhesive layer 17 is not hardened. When the thermo-setting adhesive is used, the adhesive layer 17 is heated. When the ultraviolet-curable resin is used, the adhesive layer 17 is hardened upon irradiation of ultraviolet rays. The recess/projection detection optical element 13 can be very efficiently manufactured. In this case, since the transparent particles 16 can be sprinkled appropriately sparsely, optical interference between the transparent particles 16 can be prevented.

The two-dimensional photosensor 12 has a structure in which a plurality of sensor portions (in FIG. 1, only two sensor portions are shown by 20A, 20B) are arranged in a matrix. The two-dimensional photosensor 12 has a transparent substrate (transparent base layer) 21 made of a transparent resin (e.g., acrylic resin) or glass. A bottom gate electrode 22 serving as a light-shielding electrode made of chromium or aluminum is formed for each sensor portion 20A or 20B on the upper surface of the transparent substrate 21. A bottom gate insulating film 23 made of silicon nitride is formed on the entire upper surface of the substrate 21 which includes the electrodes 22. A semiconductor layer 24 made of amorphous silicon is formed on an upper surface portion of the bottom gate insulating film 23 which corresponds to the center of the bottom gate electrode 22. $n^+$-type silicon layers 25 are respectively formed on the two sides of the upper surface of the semiconductor layer 24. Source and drain electrodes 26 and 27 as light-shielding electrodes made of chromium or aluminum are formed on the upper surfaces of the $n^+$-type silicon layers 25 and the upper surface of the bottom gate insulating film 23 which is close to the upper surfaces of the $n^+$-type silicon layers 25. A top gate insulating film 28 made of silicon nitride is formed on the entire surface of the resultant structure. A top gate electrode 29 as a transparent electrode made of ITO or the like is formed on the upper surface portion of the top gate insulating film 28 which almost corresponds to each semiconductor layer 24. An overcoat film 30 made of silicon nitride is formed on the entire surface of the resultant structure. In this two-dimensional photosensor 12, when a light beam is incident at random from the lower surface side, this light beam passes through a light-transmitting portion excluding both the bottom gate electrode 22 made of the light-shielding electrode and the source and drain electrodes 26 and 27. The light beam is shielded by the bottom gate electrode 22 and is not directly incident on the semiconductor layer 24.

Figure 2:
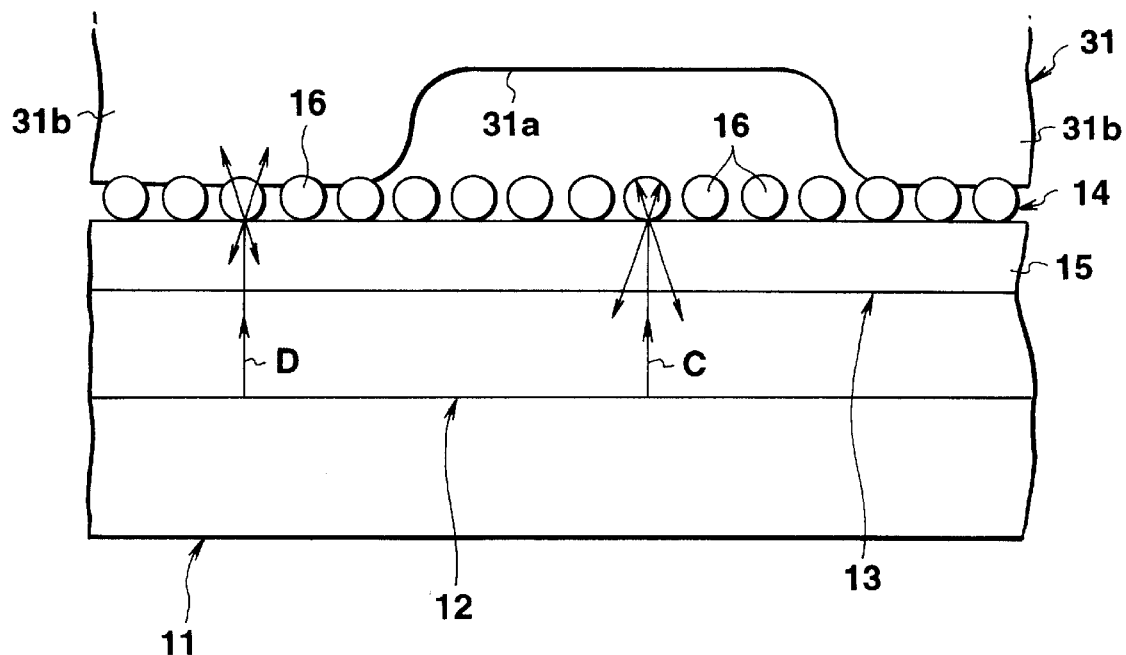
FIG. 2 is a schematic sectional view for explaining the principle of reading the fingerprint in the reading apparatus shown in FIG. 1.

In this fingerprint reading apparatus, the light beam emitted from the upper surface of the surface illuminant 11 passes through the light-transmitting portion of the two-dimensional photosensor 12. The transmitted light beam is incident on the lower surface of the recess/projection detection optical element 13. This incident light beam is scattered and reflected by the surface (i.e., the boundary between the surface and air) of the scattering reflection layer 14 of the recess/projection detection optical element 13. As shown in FIG. 2, when a finger (not shown in FIG. 1) is in tight contact with the scattering reflection layer 14, the finger is irradiated from below at random, and the scattered light beam and the reflected light beam from an area corresponding to the valley of the fingertip are transmitted through the top gate electrode 29 made of the transparent electrode near the valley of the fingertip and are incident on the incident surface of the semiconductor layer 24 below the top gate electrode 29 between the source and drain electrodes 26 and 27.

The function of the scattering reflection layer 14 will be described below with reference to FIG. 2. A light beam emitted by the surface illuminant 11 reaches the surface of the transparent base layer 15 of the recess/projection detection optical element 13. The light beam emitted almost vertically from the surface illuminant 11 is emitted to the air layer between the particles 16 directly or through the transparent particles 16. The light beam incident on the transparent base layer 15 at an angle larger than the total reflection angle is totally reflected at a portion contacting the air layer and returned to the two-dimensional photosensor 12 side. The light beam at a portion contacting the transparent particle 16 enters into the transparent particle 16, repeats total reflection in the transparent particle 16, and scatters. For this reason, when the finger is not in contact with the scattering reflection layer 14, each transparent particle 16 of the scattering reflection layer 14 is opaque and whitish. When a finger 31 is brought into contact with the scattering reflection layer 14, no change in scattering reflection state occurs in an area corresponding to a valley 31a of the fingertip. As indicated by an arrow C in FIG. 2, an amount of reflected light is large. A light beam is transmitted from the transparent particles 16 to a ridge 31b of the fingertip and is absorbed.by the ridge 31b, thereby greatly reducing the amount of reflected light, as indicated by an arrow D in FIG. 2.

When an amount of light incident on the semiconductor layer 24 of the sensor portion 20A or 20B of the two-dimensional photosensor 12 is equal to or larger than a preset amount of light (threshold value), the optical detection state of the sensor portion 20A or 20B is set as a bright state; otherwise, the optical detection state of the sensor portion 20A or 20B is set as a dark state. An image having the bright and dark portions optically emphasized in correspondence with the valley and ridge of the fingertip of the finger 31, thereby reading the fingerprint of the finger 31.

As described above, in this fingerprint reading apparatus, the recess/projection detection optical element 13 having the scattering reflection layer 14 made of the large number of transparent particles 16 is formed on the two-dimensional photosensor 12. Even if the light beams from the upper surface of the surface illuminant 11 are emitted at random, the image having the bright and dark portions optically emphasized in correspondence with the valley(s) and ridge (s) of the fingertip of the finger 31 can be obtained. In this case, no optical fiber bundle plate is used, unlike the conventional case. The optical loss in reading the fingerprint can be reduced, and the positioning precision between the components can be less strict.

The reduction in optical loss in reading the fingerprint will be described below. Of all light beams emitted at random from the upper surface of the surface illuminant 11, only the light beam shielded by the bottom gate electrode 22 does not contribute fingerprint reading, and the remaining light beams can contribute to fingerprint reading. The loss in these remaining light beams can rarely occur. Since the light beams are emitted at random from the upper surface of the surface illuminant 11, light utilization efficiency can be increased. More specifically, since the transparent substrate 21 of the two-dimensional photosensor 12 has a certain thickness, the light beams emitted at random from the upper surface of the surface illuminant 11 below the bottom gate electrode 22 can also be used as beams for reading the fingerprint. To the contrary, in the conventional case, the parallel beams emitted vertically from the upper surface of the surface illuminant 1 below the light-shielding plate 2c and transmitted to the upper surface of the light-reflecting plate 4 cannot be used as beams for reading the fingerprint.

The reason why the positioning precision of the components can be less strict will be described below. The width of the valley 31a of the fingertip of the finger 31 is about 100 μm, and the width of the ridge 31b is about 200 μm. Assume that the width (channel direction) of the sensing part of the sensor portion 20A or 20B (part of the semiconductor layer 24 between the electrodes 26, 27) of the two-dimensional photosensor 12 is set to fall within the range of about 10 to 30 μm, and that the pitch is set to fall within the range of about 30 to 100 μm and preferably about 50 to 80 μm. In this case, one to three sensor portions 20A and 20B, and preferably at least one, i.e., about two sensor portions can be arranged for the valley 31a having a smaller width (about 100 μm) of the valley and ridge 31b of the fingertip of the finger 31. When the diameter of the transparent particle 16 of the recess/projection detection optical element 13 is set to fall within the range of 1 to 30 μm, e.g., about 5 μm, a plurality of transparent particles 16 can be arranged at the position corresponding to each sensor portion 20A or 20B. With this arrangement, positioning between the two-dimensional photosensor 12 and the recess/projection detection optical element 13 can be almost eliminated.

The operation of the two-dimensional photosensor 12 will be described below. In each sensor portion 20A or 20B, the bottom gate electrode (BG) 22, the semiconductor layer 24, the source electrode (S) 26, the drain electrode (D) 27, and the like constitute a bottom gate type transistor. The top gate electrode (TG) 29, the semiconductor layer 24, the source electrode (S) 26, the drain electrode (D) 27, and the like constitute a top gate type transistor. That is, the sensor portions 20A and 20B are constituted by photoelectric transducer transistors in which the bottom gate electrode (BG) 22 and the top gate electrode (TG) 29 are formed on the lower and upper side of the semiconductor layers 24, respectively. The equivalent circuit of the sensor portions 20A and 20B is shown in FIG. 3.

Figure 3:
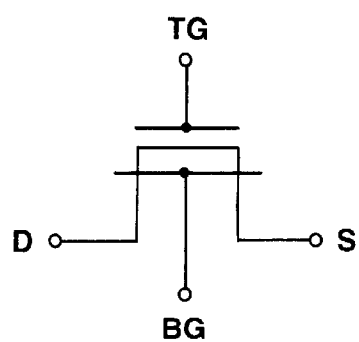
FIG. 3 is an equivalent circuit diagram of a sensor portion shown in FIG. 1.
Figures 4A, 4B:
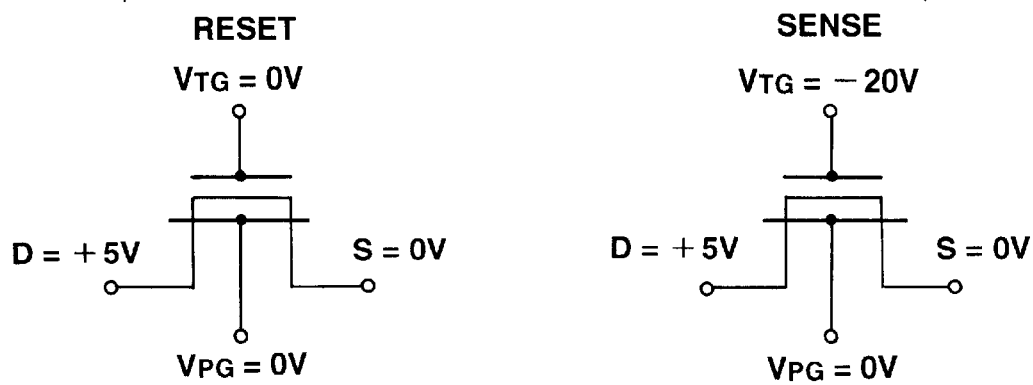
FIGS. 4A to 4D are circuit diagrams for explaining the voltages applied to the electrodes of the sensor portion shown in FIG. 3 and changes in state of the sensor portion.
Figures 4C, 4D:
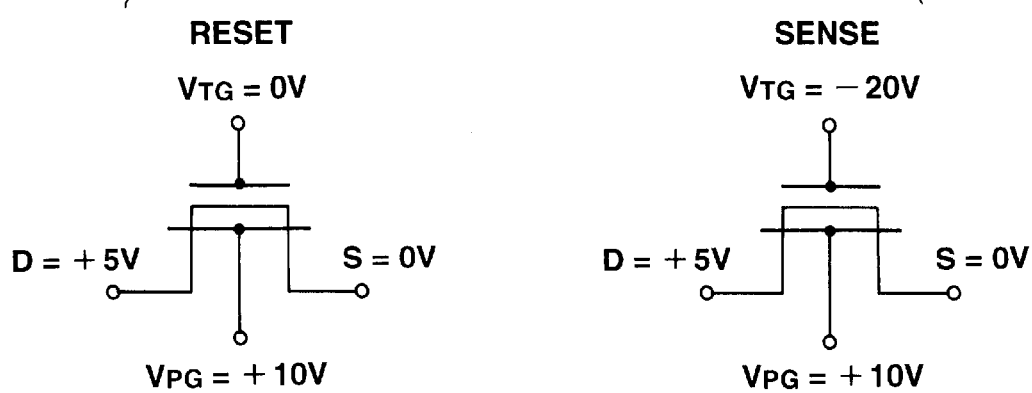

Referring to FIG. 3, when a positive voltage (e.g., +10V) is applied to the bottom gate electrode (BG) while a positive voltage (e.g., +5V) is kept applied between the source electrode (S) and the drain electrode (D), a channel is formed in the semiconductor layer 24 to flow a drain current $I_{DS}$. In this state, when a negative voltage (e.g., −20V) having a level enough to make the channel formed by the electric field of the bottom gate electrode (BG) disappear is applied to the top gate electrode (TG), the electric field from the top gate electrode (TG) acts in a direction to eliminate the channel formed by the electric field of the bottom gate electrode (GB), thereby pinching-off the channel. At this time, when the semiconductor layer 24 is irradiated with a light beam from the top gate electrode (TG) side, the electron-hole pairs are induced in the semiconductor layer 24 on the top gate electrode (TG) side. The electron-hole pairs are accumulated in the channel region of the semiconductor layer 24 to cancel the electric field of the top gate electrode (TG). A channel is then formed in the semiconductor layer 24 to flow the drain current $I_{DS}$. This drain current $I_{DS}$ changes in accordance with a change in incident light amount of the semiconductor layer 24.

As described above, in this two-dimensional photosensor 12, the electric field from the top gate electrode (TG) acts in a direction to prevent channel formation using the electric field of the bottom gate electrode (BG) to pinch-off the channel. The drain current $I_{DS}$ obtained when no light beam is incident can be greatly reduced, e.g., to about $10^{-14}$A. The difference between the drain current $I_{DS}$ obtained when no light beam is incident and the drain current $I_{DS}$ obtained when a light beam is incident can be made sufficiently large. As described above, the amount of light incident on the semiconductor layer 24 is equal to or larger than the preset amount of light (threshold value), a large drain current $I_{DS}$ flows to set the optical detection state of the sensor portion 20A or 20B to the bright state; otherwise, a small drain current $I_{DS}$ flows to set the optical detection state of the sensor portion 20A or 20B to the dark state. Therefore, the image having bright and dark portions optically emphasized in correspondence with the valley or ridge of the fingertip of the finger 31, thereby reading the fingerprint of the finger 31.

In the two-dimensional photosensor 12, each sensor portion 20A or 20B can have both a sensor function and a selection transistor function. These functions will be briefly described below. When a voltage of, e.g., ov is applied to the top gate electrode (TG) while a positive voltage (+10V) is kept applied to the bottom gate electrode (BG), holes are discharged from the trap level between the semiconductor layer 24 and the top gate insulating film 28 to allow refresh or reset operation. More specifically, when the reading apparatus is continuously used, the trap level between the semiconductor layer 24 and the top gate insulating film 28 is buried with the holes generated upon irradiation and the holes injected from the drain electrode (D). A channel resistance set while no light beam is incident is reduced, and the drain current $I_{DS}$ obtained when no light beam is incident increases. Therefore, the top gate electrode (TG) is set at 0V to discharge these holes to allow reset operation.

When the positive voltage is not applied to the bottom gate electrode (BG), no channel is formed in the bottom transistor. Even if a light beam is incident, no drain current $I_{DS}$ flows to set the nonselected state. More specifically, by controlling the voltage applied to the bottom gate electrode (BG), the selected state and the nonselected state can be controlled. In the nonselected state, when 0V is applied to the top gate electrode (TG), the holes can be discharged from the trap level between the semiconductor layer 24 and the top gate insulating film 28 to allow reset operation in the same manner as described above.

As a result, as shown in FIGS. 4A to 4D, for example, the top gate voltage VTG is controlled to fall within the range of 0V to -2V to allow control of the sensed state and the reset state. The bottom gate voltage $V_{BG}$ is controlled to fall within the range of 0V to +10V to allow control of the selected state and the nonselected state. That is, by controlling the top gate voltage $V_{TG}$ and the bottom gate voltage $V_{BG}$, each sensor portion 20A or 20B of the two-dimensional photosensor 12 can have both the function serving as a photosensor and the function serving as the selection transistor.

Figure 5:
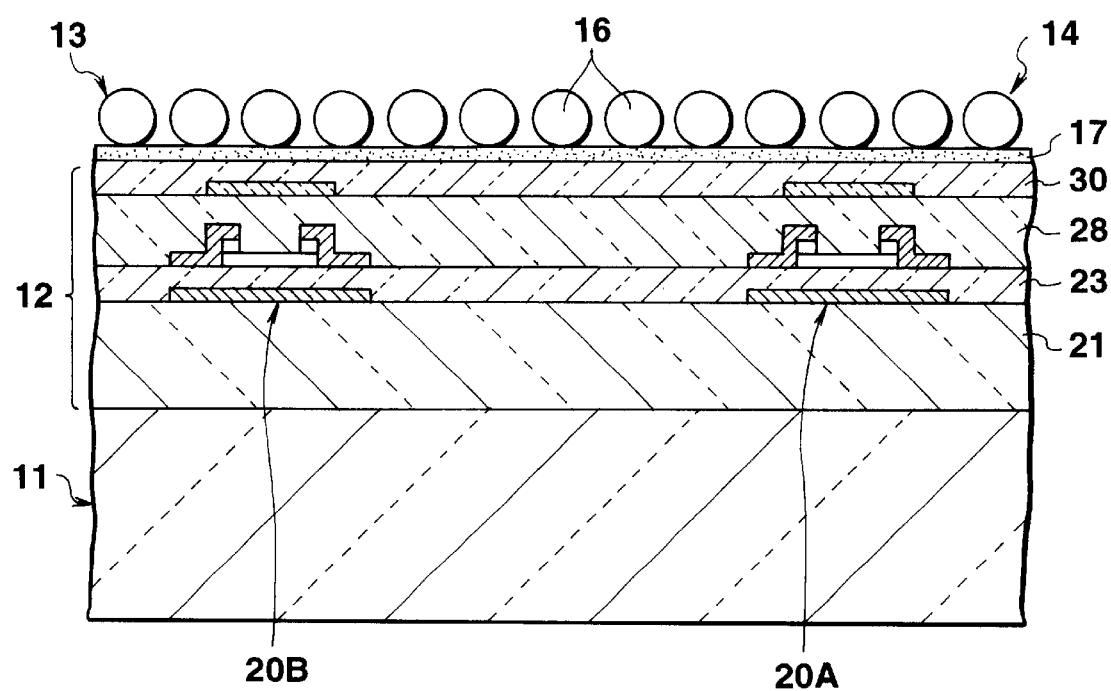
FIG. 5 is an enlarged sectional view showing a modification of the reading apparatus shown in FIG. 1.

In the above embodiment, the recess/projection detection optical element 13 is arranged separately from the two-dimensional photosensor 12. The present invention is not limited to this. For example, as shown in FIG. 5, the plurality of transparent particles 16 may be adhered to and arranged on the flat upper surface of the overcoat film 30 of the two-dimensional photosensor 12 through the adhesive layer 17. That is, the recess/projection detection optical element constituted by the transparent particles 16 and the adhesive layer 17 may be formed integrally on the flat upper surface of the overcoat film 30 of the two-dimensional photosensor 12. When the bottom gate insulating film 23, the top gate insulating film 28, and the overcoat film 30 of the two-dimensional photosensor 12 are formed by CVD, the upper surface of the overcoat film 30 becomes uneven, although not shown. In this case, a transparent resin such as acrylic resin is applied to the upper surface of the overcoat film 30 to form a transparent layer having the flat upper surface, and the plurality of transparent particles 16 may be formed on the upper surface of this transparent layer through the adhesive layer 17. Alternatively, for example, acrylic resin may be applied to the upper surface of the surface illuminant 11 to form the transparent substrate 21 of the two-dimensional photosensor 12, thereby integrally forming the two-dimensional photosensor 12 on the surface illuminant 11.

Figure 6:
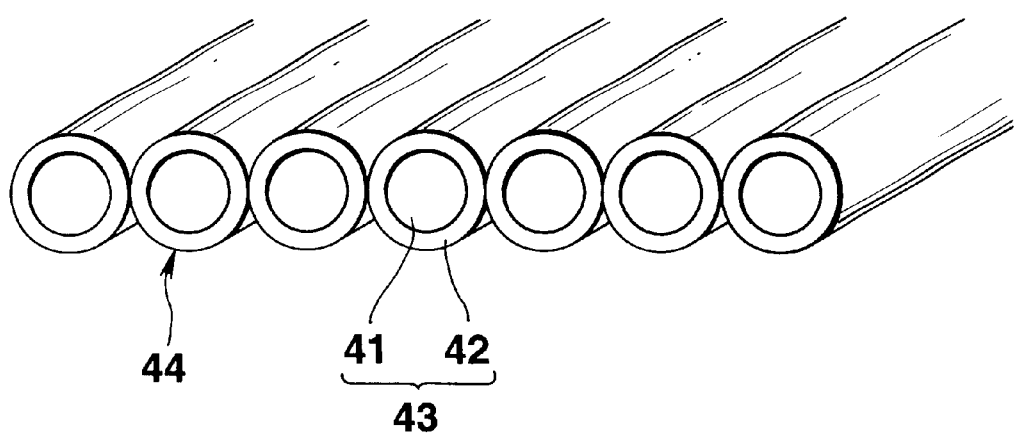
FIG. 6 is an enlarged perspective view of a recess/projection detection optical element shown in FIG. 1.
Figure 7:
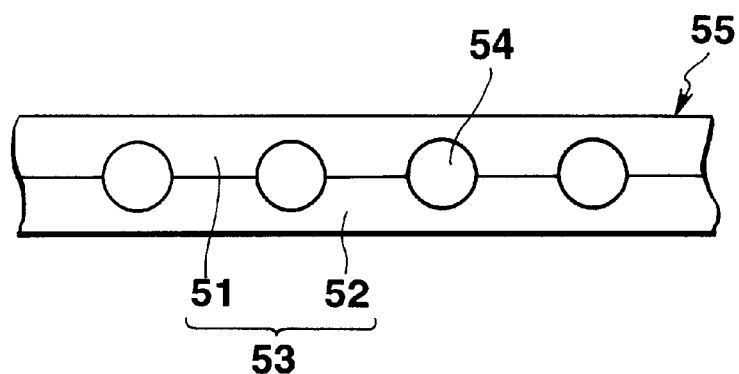
FIG. 7 is an enlarged perspective view showing a modification of the recess/projection detection op i element.

In the embodiment shown in FIG. 1, the scattering reflection layer 14 is constituted by the large number of transparent particles 16. The scattering reflection layer 14 is not limited to this. Various arrangements may be employed. For example, a recess/projection detection optical element 44 as shown in FIG. 6 is constituted by a large number of parallel optical fibers 43 each having a core 41 and a cladding 42 covering the core 41. These optical fibers 43 may be independently and directly mounted and arranged on the two-dimensional photosensor 12 or may be brought into tight contact and integrated with a resin or the like and may be arranged and mounted on the two-dimensional photosensor 12. Alternatively, a recess/projection detection optical element 55 shown in FIG. 7 is constituted by a transparent sheet 53 containing spherical cavities 54 filled with a gas such as air. To manufacture this recess/projection detection optical element 55, transparent sheets 51 and 52 having hemispherical cavities are formed and so bonded as to match the hemispherical cavities. In this case, scattering and reflection occur on the surface of each cavity. The shape of the cavity 54 is not limited to the spherical shape, but can be a triangular prismatic, polyhedral, or columnar shape. To form a scattering reflection layer, a material sealed in the cavity is not limited to the gas, but can be a liquid or solid material if the material has a refractive index lower than that of the transparent sheet 53.

Second Embodiment

Figure 8:
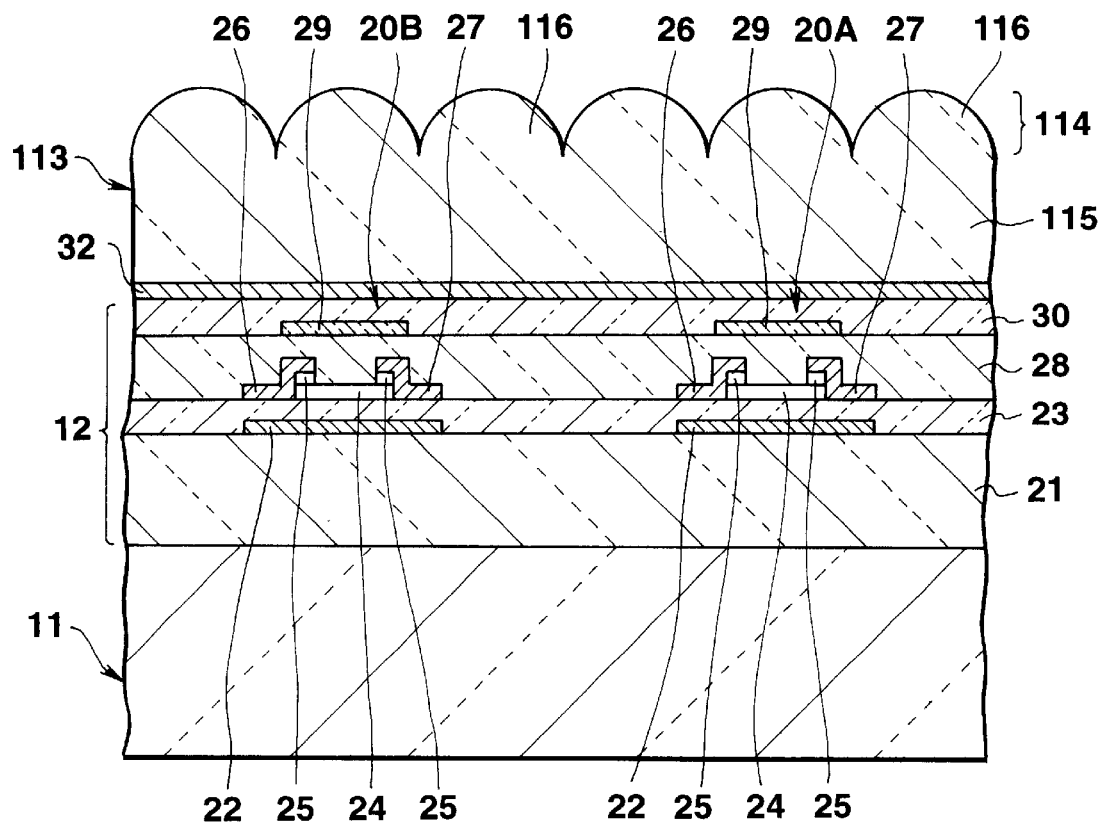
FIG. 8 is an enlarged sectional view showing main part of a reading apparatus according to the second embodiment of the present invention.

FIG. 8 is an enlarged sectional view showing a part of a fingerprint reading apparatus according to the second embodiment of the present invention. The same reference numerals as in the embodiment shown in FIG. 1 denote the same parts in the second embodiment, and a detailed description thereof will be omitted.

The second embodiment has substantially the same structure as that of the first embodiment except that a transparent conductive layer 32 made of ITO or the like is formed on a two-dimensional photosensor 12, and a recess/projection detection optical element 113 is formed on the transparent conductive layer 32. The recess/projection detection optical element 113 is made of a thin sheet having a thickness of about 200 μm or less. The transparent conductive layer 32 serves as an electro-static proof layer and is grounded to an appropriate lead wire (not shown). The transparent conductive layer 32 is integrally formed on the upper surface of an overcoat film 30 of the two-dimensional photosensor 12 or the lower surface of a transparent base layer 115 of the recess/projection detection optical element 113 by deposition or the like. A large number of elongate projections or ridges 116 having a substantially hemispherical section are formed parallel on the upper surface of the transparent base layer 115 made of acrylic resin or glass. The large number of projections 116 constitute a scattering reflection layer 114 to be described later.

In this fingerprint reading apparatus, the transparent conductive layer 32 is formed on the two-dimensional photosensor 12 and grounded. Even if the apparatus has a low-profile structure in which the recess/projection detection optical element 113 having a thickness of about 200 μm or less is in tight contact with the two-dimensional photosensor 12, strong static electricity can be discharged from a finger (not shown) brought into tight contact with the recess/projection detection optical element 113 through the transparent conductive layer 32. Therefore, the operation error of and damage to the sensor portions of the two-dimensional photosensor 12 due to this strong static electricity can be prevented.

The operation of the fingerprint reading apparatus shown in FIG. 8 will be described with reference to FIG. 9. Light beams emitted at random from the upper surface of a surface illuminant 11 are transmitted through the transparent conductive layer 32 and the light-transmitting portion of the recess/projection detection optical element 113. These light beams are incident on the lower surface of the recess/projection detection optical element 113. A finger 31 placed in tight contact with the projections 116 of the recess/projection detection optical element 113 is irradiated with these incident light beams. The light beams reflected by the surfaces of the projections 116 are transmitted through the transparent conductive layer 32 and top gate electrodes 29 made of transparent electrodes located near the transparent conductive layer 32. The transmitted light beams are incident on semiconductor layers 24 located below the top gate electrodes 29. In this case, the light beams incident on the lower surface of the recess/projection detection optical element 113 are reflected by the surfaces of the projections 116 once to several times (mainly multiple reflection). In principle, total reflection occurs at a portion corresponding to a valley 31a of the fingertip of the finger 31 placed in tight contact with the projections 116, and scattering and transmission occur at a portion corresponding to a ridge 31b of the fingertip of the finger 31.

Figure 9:
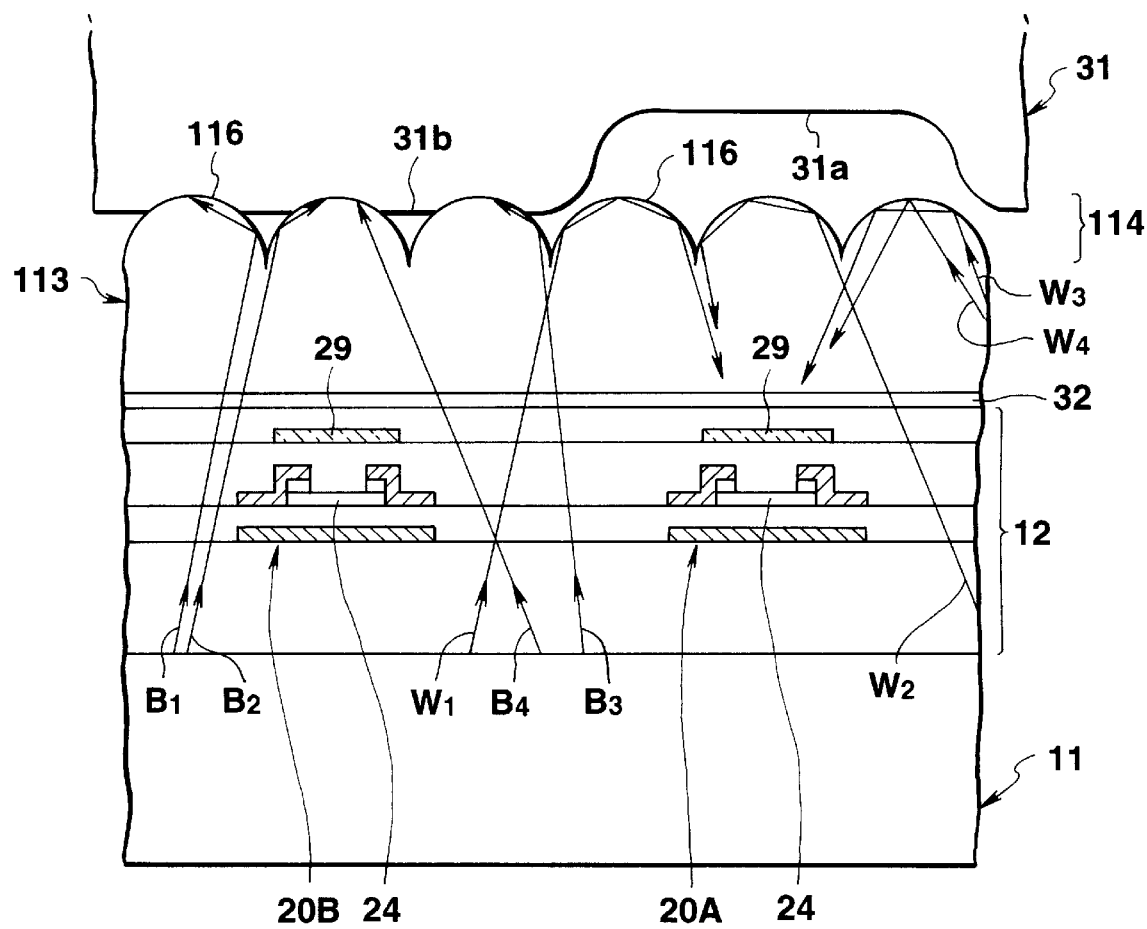
FIG. 9 is a schematic sectional view for explaining the principle of reading the fingerprint in the reading apparatus shown in FIG. 8.

More specifically, since the light beams are emitted at random from the upper surface of the surface illuminant 11, light beams are reflected by the surfaces of the projection portions 116 corresponding to the valley 31a of the fingertip of the finger 31 and are incident on the neighboring semiconductor layer 24, as indicated by arrows $W_1$, $W_2$, and $W_3$ in FIG. 9. Some light beam is reflected once on the surface of the projection 116 corresponding to the valley 31a of the fingertip of the finger 31 and incidents on the neighboring semiconductor layer 24, as indicated by an arrow $W_4$. This light beam is the minority. In any case, a large number of light beams are incident on the semiconductor layer 24 located near the valley 31a of the fingertip of the finger 31. On the other hand, as indicated by arrows $B_1$, $B_2$, and $B_3$ in FIG. 9, light beams which are to be reflected several times on the surfaces of the projections 116 corresponding to the ridge 31b of the fingertip of the finger 31 are reflected and finally scattered and transmitted. A light beam which is about to be reflected once by the surface of the projection 116 corresponding to the ridge 31b of the fingertip of the finger 31 is directly transmitted without reflection, as indicated by an arrow $B_4$. The light beams are rarely incident on the semiconductor layer 24 close to the ridge 31b of the fingertip of the finger 31. When the amount of light incident on the semiconductor layer 24 is equal to or larger than the preset amount of light (threshold value), the optical detection state of the sensor portion is set as the bright state; otherwise, the optical detection state of the sensor portion is set as the dark state. An image having the bright and dark portions optically emphasized in correspondence with the valley and ridge of the fingertip of the finger 31 is obtained, thereby reading the fingerprint of the finger 31.

Figure 10:
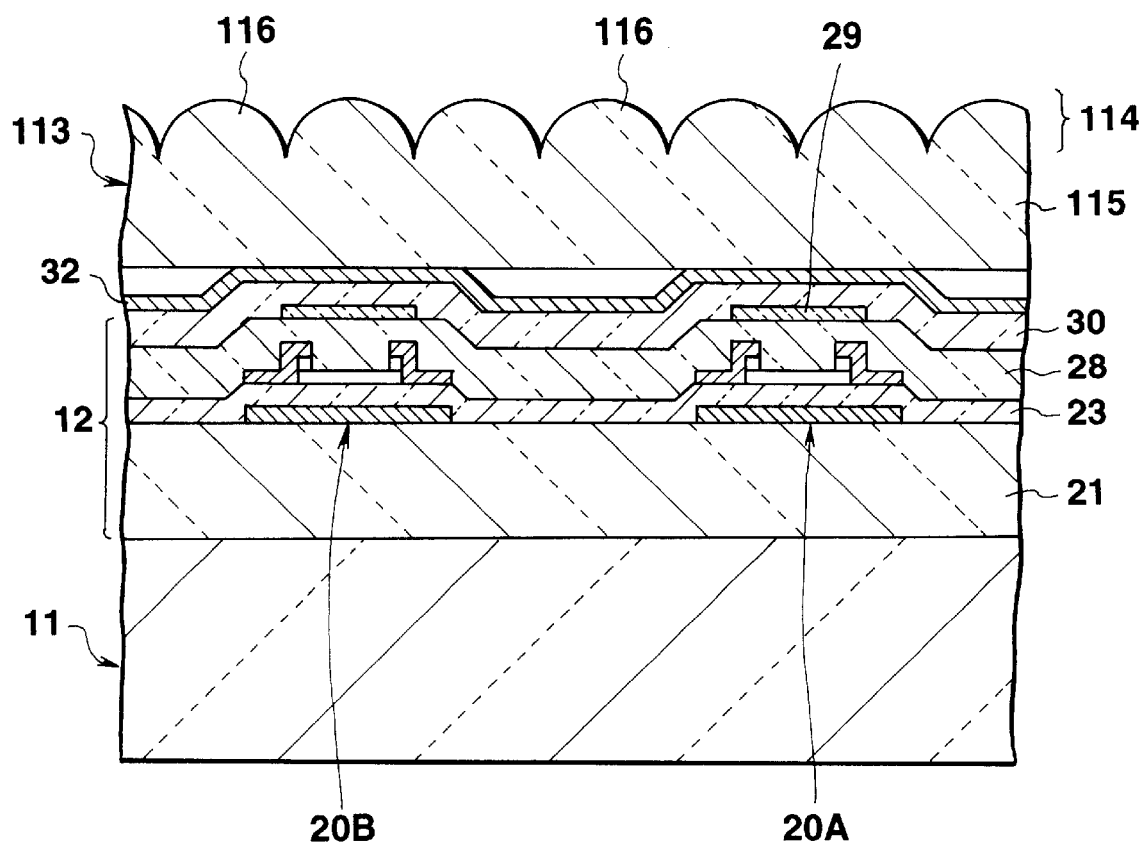
FIG. 10 is an enlarged sectional view showing part of a modification of the reading apparatus shown in FIG. 8.

The recess/projection detection optical element shown in FIG. 8 can be formed integrally on the two-dimensional photosensor 12, and FIG. 10 shows its modification. After the top gate electrode 29 and the overcoat film 30 of the two-dimensional photosensor 12 are formed, the transparent conductive film 32 is formed on the overcoat film 30 by sputtering or the like. The resultant structure is accommodated in a mold to integrally mold the recess/projection detection optical element 113 on the surface of the transparent conductive film 32. If the upper surfaces of the projections 116 of the recess/projection detection optical element 113 must be flat, one or both of the top gate insulating film 28 and the overcoat film 30 may be formed by spin coating.

To form the recess/projection detection optical element 113 separately from the two-dimensional photosensor 12, a bottom gate insulating film 23, a top gate insulating film 28, and the overcoat film 30 of the two-dimensional photosensor 12 are normally formed by sputtering or CVD. When they are formed by such dry deposition, the upper surfaces of the films 23, 28, and 30 are made uneven, as shown in FIG. 10. That is, each sensor portion is made thicker than a portion between the sensor portions, and the surface of the overcoat film 30 is made uneven. In this case, the transparent conductive film 32 may be directly formed on the uneven surface of the overcoat film 30 by deposition or the like. Alternatively, although not shown, a transparent planarizing layer (not shown) may be formed on the uneven upper surface of the overcoat film 30, and the transparent conductive film 32 may be formed on this planarizing layer. To form the transparent planarizing layer on the upper surface of the overcoat film 30, a sheet-like transparent conductive layer 32 may be adhered to the upper surface of the planarizing layer through a transparent adhesive. Alternatively, a sheet-like transparent conductive layer 32 may be adhered to the lower surface of the transparent base layer 115 of the recess/projection detection optical element 113 through a transparent adhesive.

Figure 11:
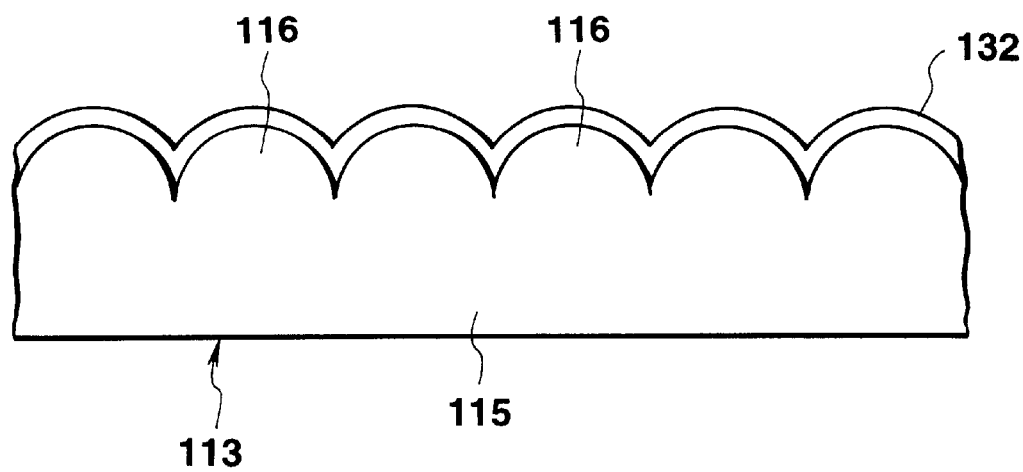
FIG. 11 is an enlarged perspective view showing a modification of the recess/projection detection optical element shown in FIG. 1.
Figure 12A:
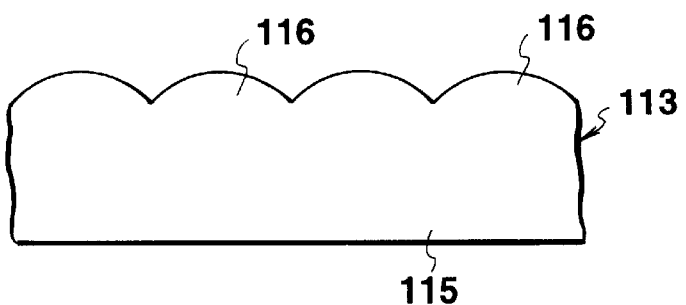
FIGS. 12A to 12D are views for explaining the modifications of the recess/projection detection optical element shown in FIG. 8.
Figure 12B:
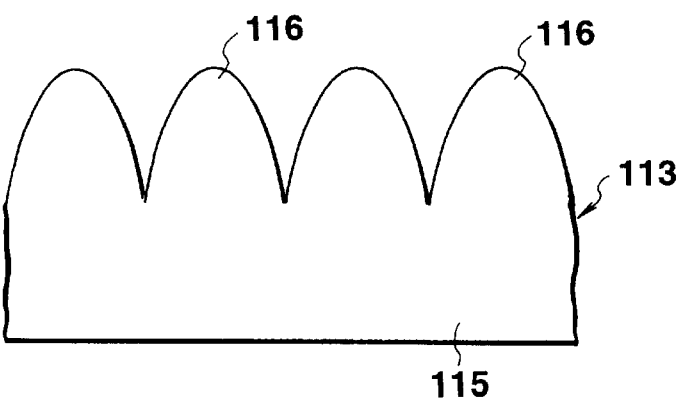
Figure 12C:
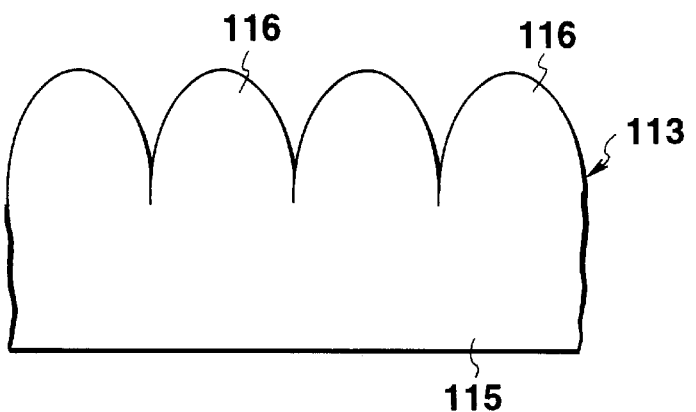
Figure 12D:
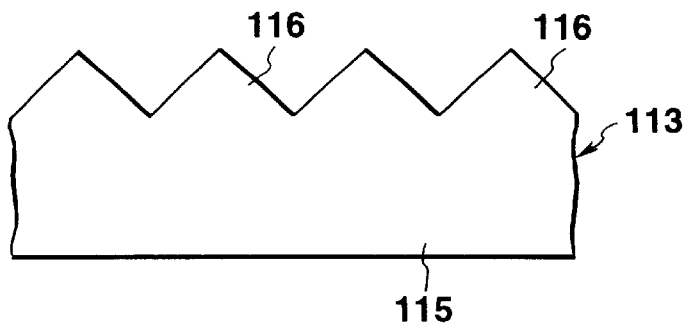

In the above embodiment, the transparent conductive layer 32 is formed on the upper surface of the two-dimensional photosensor 12 or the lower surface of the recess/projection detection optical element 113. The present invention is not limited to this. For example, as shown in FIG. 11, a transparent conductive layer 132 may be formed on the upper surfaces of the projections 116 of the recess/projection detection optical element 113 along these upper surfaces by deposition or the like. Alternatively, transparent conductive layers may be formed on any two or all of the upper surface of the two-dimensional photosensor 12 and the lower and upper surfaces of the recess/projection detection optical element 113.

Figure 13A:
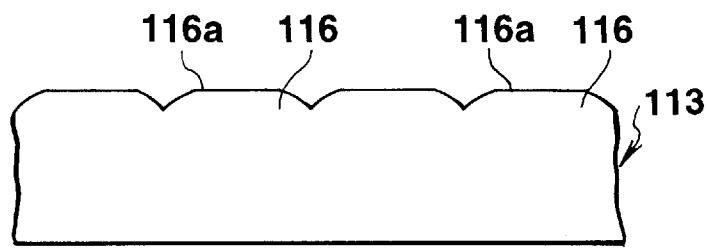
FIGS. 13A to 13D are views for explaining other modifications of the recess/projection detection optical element shown in FIG. 8.
Figure 13B:
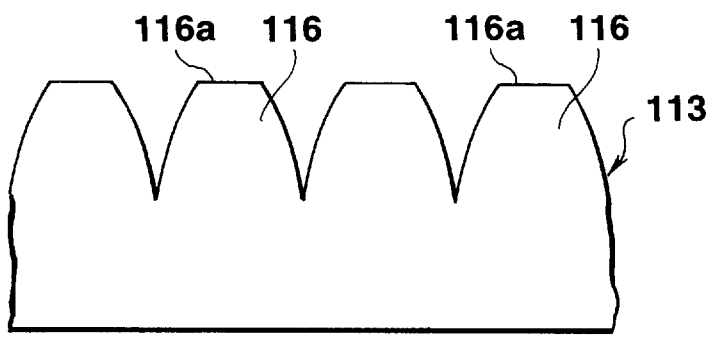
Figure 13C:
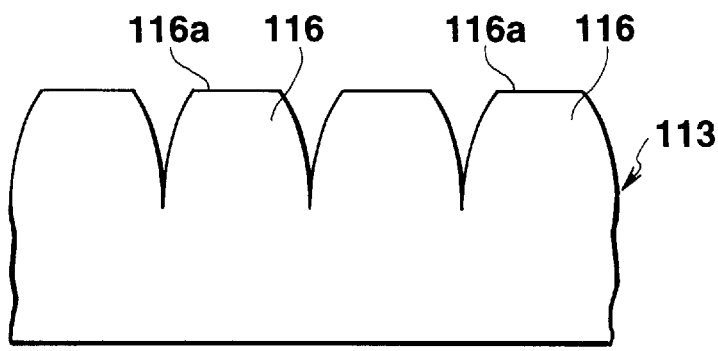
Figure 13D:
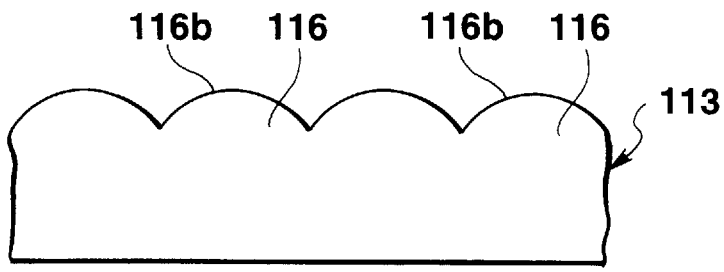

In the above embodiment, the sectional shape of the projection 116 of the recess/projection detection optical element 113 is substantially hemispherical. The present invention is not limited to this. For example, as shown in FIGS. 12A to 12D, the sectional shape of an arc as part of a circle, the sectional shape of part of a parabola, the sectional shape of part of an ellipse, and the sectional shape of a rectangular equilateral triangle may be used. As shown in FIGS. 13A to 13C, the truncated shapes obtained by truncating the top portions of the projections 116 shown in FIGS. 12A to 12C to obtain flat surfaces 116a parallel to the lower surface of the transparent base layer 115 may be used. Although not shown, the top portions of the projections 116 shown in FIG. 8 may be constituted by flat surfaces parallel to the lower surface of the transparent base layer 115. As shown in FIG. 13D, the top portions of the projections 116 shown in FIG. 12D may be replaced with surfaces 116b having a sectional shape of an arc as part of a circle, as shown in FIG. 13D.

Figure 14:
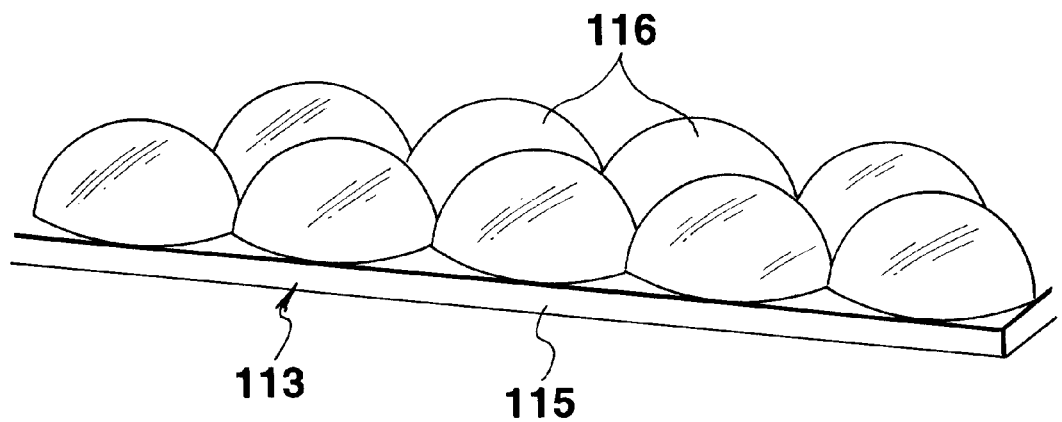
FIG. 14 is a view for explaining still another modification of the recess/projection detection optical element.

In the above embodiment, the recess/projection detection optical element 113 has a structure in which the large number of elongate projections 116 are arranged parallel on the upper surface of the transparent base layer 115. The present invention is not limited to this. For example, as shown in FIG. 14, a large number of hemispherical projections (protrusions) 116 may be staggered on the upper surface of the transparent base layer 115, thereby constituting the recess/projection detection optical element 113. Although not shown, the shape is not limited to the hemispherical shape, but can be the shape of a doom constituting part of a sphere, part of a stereoscopic shape obtained by rotating a parabola about a predetermined axis, part of a stereoscopic shape obtained by rotating an ellipse about a predetermined axis, or the shape of a quadrangular prism. These shapes may be truncated, as shown in FIGS. 13A to 13D.

Figure 15:
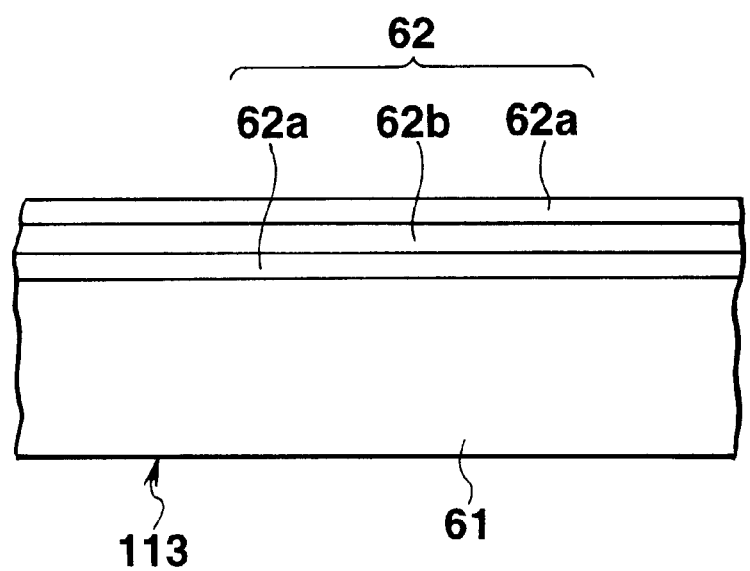
FIG. 15 is a view showing still another modification of the recess/projection detection optical element.
Figure 16:
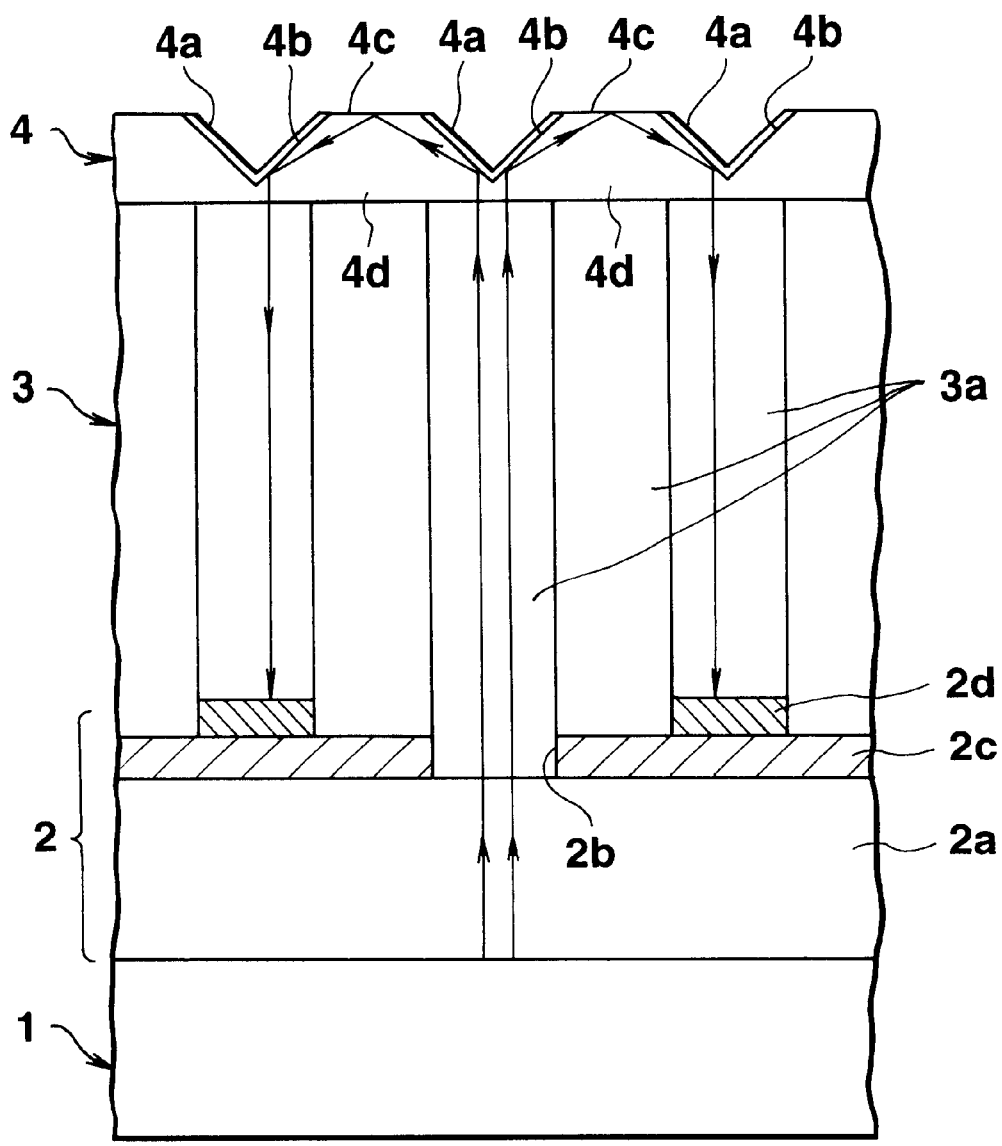
FIG. 16 is an enlarged sectional view of a conventional reading apparatus.

In the above embodiment, the upper surface of the recess/projection detection optical element 113 is made uneven. The present invention is not limited to this. For example, as shown in FIG. 15, the recess/projection detection optical element 113 may be constituted by a structure in which a high-reflection layer 62 having a plurality of laminated layers having different refractive indices is formed on the upper surface of a transparent plate 61 made of acrylic resin or glass. For example, the high-reflection film 62 has a structure in which an aluminum oxide layer 62a, a zinc oxide layer 62b, and a magnesium fluoride layer 62c are formed by deposition, coating, or the like on the upper surface of the transparent plate 61 in the order named. The thickness of each of the layers 62a, 62b, and 62c falls within the range of about several ten to several hundred Å. The high-reflection layer 62 increases reflection using interference of reflected light beams at the boundary surfaces of the layers 62a, 62b, and 62c. High reflection occurs at the upper surface portion of the high-reflection layer 62 which is in tight contact with the valley of the fingertip of the finger, and low reflection occurs at a portion corresponding to the ridge of the fingertip of the finger. An image having the bright and dark portions optically emphasized in correspondence with the valley or ridge of the fingertip of the finger can be obtained, thereby reading the fingerprint of the finger. Note that a low-reflection layer may be formed on the lower surface of the transparent plate 61.

As has been described above, according to the present invention, a recess/projection detection optical element having a scattering reflection layer on at least the upper surface is formed on a photosensor, and the conventional optical fiber bundle plate is not used. Therefore, the optical loss in reading the fingerprint or the like can be reduced, and positioning precision of the components can be less strict.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for reading a fingerprint comprising:
 a light source;
 a photosensor having a transparent substrate opposing said light source, said photosensor having a plurality of photosensor portions formed on said substrate and a transparent resin layer covering said photosensor portions; and
 a scattering reflection layer formed on said photosensor on a side opposing said light source;
 wherein light emitted by said light source and scattered and reflected by said scattering reflection layer is incident on each photosensor portion; and
 wherein said scattering reflection layer includes a large number of fine transparent particles.

2. An apparatus according to claim 1, wherein each of said photosensor portions comprises a photoelectric transducer transistor having a first gate electrode having light-shielding properties and located on a light source side and a second gate electrode having light-transmitting properties and located on a scattering reflection layer side.

3. An apparatus according to claim 1, wherein the transparent particles are adhered to said photosensor.

4. An apparatus according to claim 1, wherein the transparent particles are substantially spherical particles each having a diameter of 1 to 30 μm.

5. An apparatus according to claim 1, wherein said photosensor portions are arranged at a pitch of 30 to 100 μm.

6. An apparatus for reading a fingerprint comprising:
 a light source;
 a photosensor having a transparent substrate opposing said light source, said photosensor having a plurality of photosensor portions formed on said substrate and a transparent resin layer covering said photosensor portions;
 a scattering reflection layer formed on said photosensor on a side opposing said light source; and
 an antistatic transparent conductive film formed between said photosensor and said scattering reflection layer;
 wherein light emitted by said light source and scattered and reflected by said scattering reflection layer is incident on each photosensor portion.

7. An apparatus according to claim 6, wherein said scattering reflection layer includes a sheet-like member having a plurality of protrusions arranged at a small pitch.

8. An apparatus according to claim 7, wherein each of said protrusions has a columnar shape.

9. An apparatus according to claim 7, wherein each of said protrusions has a substantially hemispherical shape.

10. An apparatus according to claim 7, wherein each of said protrusions has a pyramidal shape.

11. An apparatus according to claim 6, wherein said scattering reflection layer includes a plurality of optical fibers arranged parallel to each other.

12. An apparatus according to claim 11, wherein each of said optical fibers is adhered to said photosensor.

13. An apparatus according to claim 11, wherein said optical fibers are arranged parallel to each other to constitute a plate-like member.

14. An apparatus according to claim 6, wherein each of said photosensor portions comprises a photoelectric transducer transistor having a first gate electrode having light-shielding properties and located on a light source side and a second gate electrode having light-transmitting properties and located on a scattering reflection layer side.

15. An apparatus for reading a fingerprint comprising:
 a light source;
 a photosensor having a transparent substrate opposing said light source, said photosensor having a plurality of photosensor portions formed on said substrate and a transparent resin layer covering said photosensor portions; and
 a scattering reflection layer formed on said photosensor on a side opposing said light source;

wherein light emitted by said light source and scattered and reflected by said scattering reflection layer is incident on each photosensor portion; and wherein said scattering reflection layer includes a plurality of transparent sheets having different refractive indices.

16. An apparatus for reading a fingerprint comprising:

a light source;

a photosensor having a transparent substrate opposing said light source, said photosensor having a plurality of photosensor portions formed on said substrate and a transparent resin layer covering said photosensor portions;

a scattering reflection layer formed on said photosensor on a side opposing said light source; and a transparent conductive film for preventing static electricity formed on one surface of said scattering reflection layer;

wherein light emitted by said light source and scattered and reflected by said scattering reflection layer is incident on each photosensor portion.

17. An apparatus according to claim 16, wherein each of said photosensor portions comprises a photoelectric transducer transistor having a first gate electrode having light-shielding properties and located on a light source side and a second gate electrode having light-transmitting properties and located on a scattering reflection layer side.

18. An apparatus according to claim 16, wherein said scattering reflection layer includes a sheet-like member having a plurality of protrusions arranged at a small pitch.

19. An apparatus according to claim 16, wherein said scattering reflection layer includes a plurality of optical fibers arranged parallel to each other.

20. An apparatus according to claim 18, wherein each of said protrusions has a columnar shape.

21. An apparatus according to claim 18, wherein each of said protrusions has a substantially hemispherical shape.

22. An apparatus according to claim 18, wherein each of said protrusions has a pyramidal shape.

23. An apparatus according to claim 19, wherein each of said optical fibers is adhered to said photosensor.

24. An apparatus according to claim 19, wherein said optical fibers are arranged parallel to each other to constitute a plate-like member.

25. An apparatus for reading a fingerprint comprising:

a light source;

a photosensor arranged on said light source and having a large number of photosensor portions; and a large number of transparent particles attached to said photosensor and spaced apart from each other.

26. An apparatus for reading a fingerprint comprising:

a light source;

a photosensor arranged on said light source and having a large number of photosensor portions; and a scattering reflection layer including a transparent base layer mounted on the photosensor and having a plurality of hollow portions in which at least one of a gas and a liquid is filled.

27. An apparatus for reading a fingerprint comprising:

a light source;

a photosensor arranged on said light source and having a large number of photosensor portions;

a scattering reflection layer formed on said photosensor; and a transparent conductive film for preventing static electricity formed on said scattering reflection layer, wherein light emitted by said light source and scattered and reflected by said scattering reflection layer is incident on each photosensor portion.

28. An apparatus according to claim 27, wherein said transparent conductive film is formed between said photosensor and said scattering reflection layer.

29. An apparatus for reading a fingerprint comprising:

a light source;

a photosensor arranged on or over said light source, said photosensor comprising a plurality of photosensor portions each of which includes a semiconductor layer, source and drain electrodes, and a gate electrode, wherein each of said photosensor portions outputs a drain current in accordance with an amount of incident light to said semiconductor layer thereof;

a recess/projection detection optical element layer disposed on said photosensor, said recess/projection detection optical element having an upper surface to be contacted with a finger thereon and a lower surface opposing said upper surface; and a transparent conductive film for preventing static electricity formed on one of said upper and lower surfaces of said recess/projection detection optical element layer.

30. An apparatus for reading a fingerprint comprising:

a light source;

a photosensor arranged on or over said light source, said photosensor comprising a plurality of photosensor portions each of which includes a semiconductor layer, source and drain electrodes, and a transparent gate electrode, wherein an overcoat film is deposited on an entire surface of said photosensor portions, and wherein each of said photosensor portions outputs a drain current in accordance with an amount of incident light to said semiconductor layer thereof; and a transparent conductive film for preventing static electricity formed on said overcoat film of said photosensor.

* * * * *